(12) United States Patent
Cartwright et al.

(10) Patent No.: US 10,380,697 B1
(45) Date of Patent: Aug. 13, 2019

(54) SYSTEM AND METHOD TO INTERACTIVELY UPDATE INSURANCE INFORMATION BASED ON VEHICLE MODIFICATIONS

(71) Applicant: United Services Automobile Association, San Antonio, TX (US)

(72) Inventors: Kevin M. Cartwright, Boerne, TX (US); Michele Bevier, Boerne, TX (US); Perry M. Greer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 624 days.

(21) Appl. No.: 15/088,507

(22) Filed: Apr. 1, 2016

Related U.S. Application Data

(60) Provisional application No. 62/138,821, filed on Mar. 26, 2015.

(51) Int. Cl.
  *G06Q 40/08* (2012.01)
  *G06F 3/0484* (2013.01)
(52) U.S. Cl.
  CPC ......... *G06Q 40/08* (2013.01); *G06F 3/04842* (2013.01)
(58) Field of Classification Search
  CPC ........ G06Q 10/00; G06Q 20/00; G06Q 30/00; G06Q 40/00
  USPC ...................................................... 705/3–44
  See application file for complete search history.

(56) References Cited

U.S. PATENT DOCUMENTS

| | | | | |
|---|---|---|---|---|
| 5,432,904 A | * | 7/1995 | Wong ..................... | G06Q 10/04 701/29.3 |
| 5,839,112 A | * | 11/1998 | Schreitmueller ...... | G06Q 30/06 705/4 |
| 6,185,540 B1 | * | 2/2001 | Schreitmueller ...... | G06Q 30/06 705/4 |
| 7,636,676 B1 | * | 12/2009 | Wolery .................. | G06Q 30/02 705/26.4 |
| 7,921,041 B1 | * | 4/2011 | Wolery .................. | G06Q 30/02 705/26.1 |
| 8,473,365 B2 | * | 6/2013 | Scruton .................. | G06Q 10/10 705/26.1 |
| 8,725,543 B1 | * | 5/2014 | Hanson .................. | G06Q 40/08 705/4 |

(Continued)

*Primary Examiner* — Frantzy Poinvil
(74) *Attorney, Agent, or Firm* — Baker & Hostetler LLP

(57) ABSTRACT

A computer system for determining replacement cost associated with a vehicle is provided. The computer system includes a memory configured to store instructions and a processor disposed in communication with the memory. The processor upon execution of the instructions is configured to receive identification data relating to a vehicle and acquire an image based on the identification data that include components associated with the vehicle, provide the image to a user via a graphical user interface (GUI) with at least one component of the vehicle having an associated interactive element of the GUI. In response to user selection of the component via the GUI, the user is prompted to select a component type from a plurality of component types for the component. The processor is configured to determine a replacement cost for a selected type of component type, and provide the determined replacement cost that was determined to the user.

19 Claims, 7 Drawing Sheets

(56) References Cited

U.S. PATENT DOCUMENTS

| | | | |
|---|---|---|---|
| 2006/0064393 A1* | 3/2006 | Orr | G06Q 10/10 705/400 |
| 2006/0212194 A1* | 9/2006 | Breed | G07C 5/008 701/1 |
| 2010/0082274 A1* | 4/2010 | Son | G01H 1/00 702/56 |
| 2012/0109662 A1* | 5/2012 | Shah | G06Q 30/0283 705/1.1 |
| 2014/0122130 A1* | 5/2014 | Kelly | G06Q 40/08 705/4 |
| 2014/0310186 A1* | 10/2014 | Ricci | H04W 4/21 705/302 |
| 2016/0071336 A1* | 3/2016 | Owen | G07C 5/008 701/31.4 |
| 2016/0189440 A1* | 6/2016 | Cattone | G07C 5/008 701/31.5 |

* cited by examiner

SYSTEM AND METHOD TO INTERACTIVELY UPDATE INSURANCE INFORMATION BASED ON VEHICLE MODIFICATIONS

CROSS REFERENCE TO RELATED APPLICATIONS

This application claims priority to U.S. Patent Application Ser. No. 62/138,821 filed Mar. 26, 2015 which is incorporated herein by reference in its entirety.

FIELD OF THE INVENTION

The disclosed embodiments generally relates to a system and method for providing an interactive GUI vehicle configuration, and more particularly, to updating insurance information based on an updated vehicle configuration.

BACKGROUND OF THE INVENTION

Vehicle owners frequently seek to upgrade a vehicle by exchanging a component with a compatible component of a different make or model. However, unless the insurance company is notified about the upgrade, the vehicle insurance owner is not insured for the increased value of the upgraded component. If the vehicle owner does notify the insurance company of the upgrade, the insurance policy can be upgraded to cover the increased value of the upgraded component. However, the vehicle owner may be uninformed until the insurance policy is in effect, what the effect of the upgrade is on the premium for the insurance policy, or what value the insurance policy would pay out for the vehicle or the upgraded component in the event of a claim for benefits.

When contemplating an upgrade to a vehicle, the vehicle owner does not have access to insurance information, including how obtaining coverage for an upgraded component would affect the premium for the insurance policy, or what value the insurance policy would pay out for the vehicle or the upgraded component in the event of a claim for benefits. Accordingly, the vehicle owner chooses which component to upgrade and which component type to use for the upgrade without access to the impact of the upgrade on insurance policy premiums or replacement value of the vehicle or the upgraded component in the event of a claim for benefits. Accordingly, there is a need for a vehicle owner to be able to access this information when contemplating a vehicle purchase, vehicle customization, and for a vehicle upgrade.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system for determining replacement cost associated with a vehicle is described in which a computer system is provided that has a memory configured to store instructions and a processor disposed in communication with the memory. Upon execution of the instructions, the processor is configured to receive identification data relating to a vehicle and acquire an image based on the identification data. The image includes components associated with the vehicle.

The processor is further configured to provide the image to a user via a graphical user interface (GUI) with at least one component of the vehicle. Each of the components preferably has an associated interactive element of the GUI. In response to user selection of the component via the GUI, the user is prompted to select a component type from a plurality of component types for the component. Upon execution of the instructions, the processor is configured to determine a replacement cost for a selected type of component type, and provide the determined replacement cost that was determined to the user.

In certain illustrated embodiments, the replacement cost is associated with an insurance policy. The processor upon execution of the instructions can further be configured to determine a premium associated with the insurance policy based on the replacement cost. The processor upon execution of the instructions can further be configured to determine a replacement cost for the vehicle based on the determined replacement cost that was determined for the selected component type. The processor upon execution of the instructions can further be configured to update the image based on the selected component type. The GUI can provide multiple hierarchical prompts to the user to select the component type from a plurality of component types for the component.

The processor upon execution of the instructions can further be configured to receive a recorded sound file that includes recording of a sound associated with operation of the vehicle, perform analytics on the sound file to determine a second component of the vehicle used to cause the sound. The processor upon execution of the instructions can further be configured to determine a replacement cost for the second component.

It is to be appreciated the vehicle can be one of a (but is not to be limited to): motorcycle, automobile, boat, plane, or another recreational vehicle. For instance, the component can be one of an exhaust system, wheel, engine, component, transmission component, seat type, chassis component, sound system component, alarm component, and instrumentation component. The component type can be one of a model, make, grade, and style of the selected component. In certain illustrated embodiments, the user can select a plurality of components.

In a further aspect, a computer system for determining replacement cost associated with a vehicle is described in which a computer system is provided that has a memory configured to store instructions and a processor disposed in communication with the memory. Upon execution of the instructions, the processor is configured to access an image of the customized vehicle, perform optical analytics on the image to detect at least one component of the vehicle, determine a replacement cost for the at least one component, and provide the determined replacement cost that was determined to a user.

In a further aspect, a computer system for determining replacement cost associated with a vehicle is described in which a computer system is provided that has a memory configured to store instructions and a processor disposed in communication with the memory. Upon execution of the instructions, the processor is configured to receive a recorded sound file that includes a recording of a sound associated with operation of the vehicle and perform analytics on the sound file to determine a component of the vehicle used to cause the sound.

In embodiments, the processor upon execution of the instructions can further be configured to determine a replacement cost for the component that was determined, and provide the replacement cost that was determined to the user.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
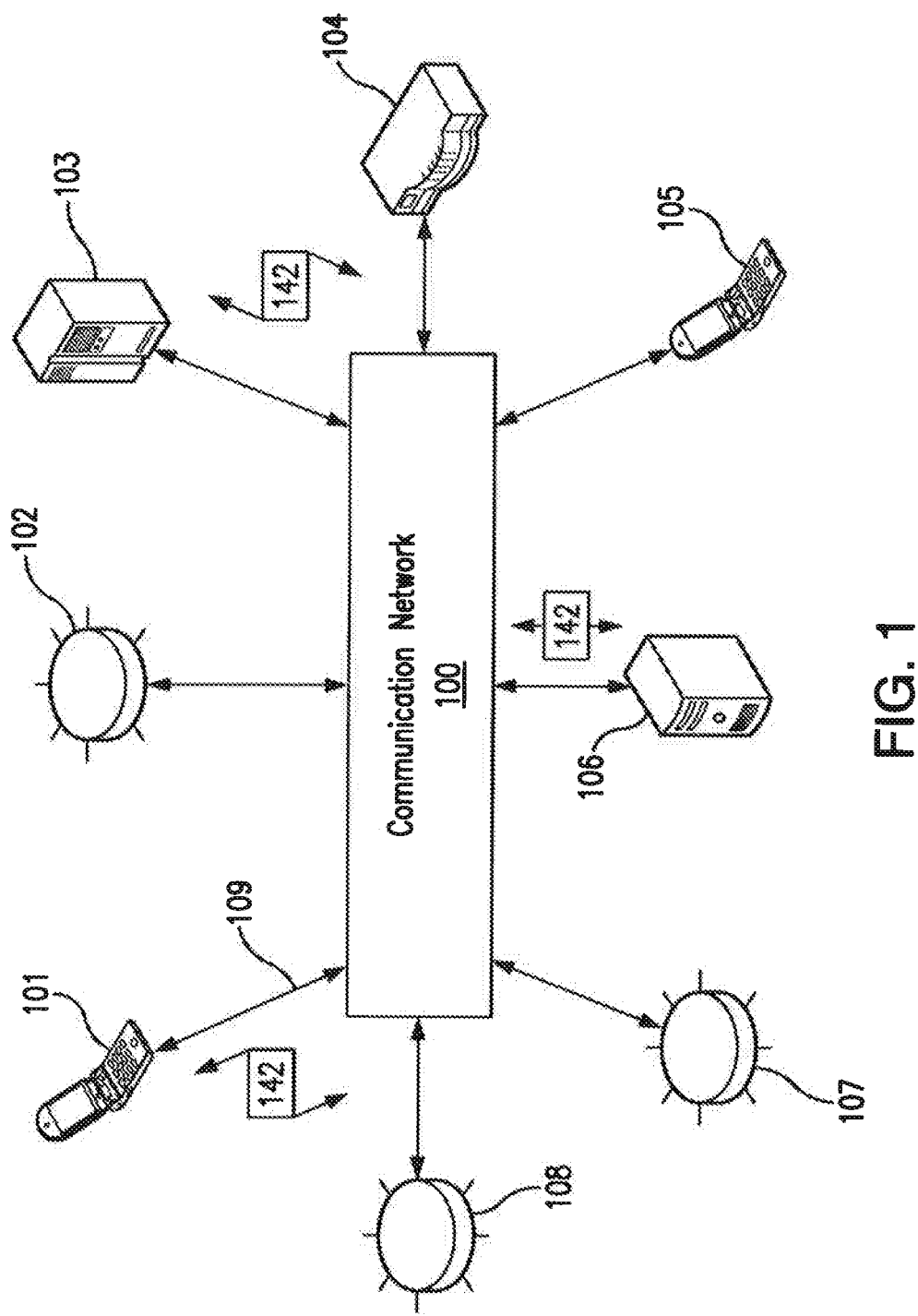
FIG. 1 illustrates an example communication network.

The illustrated embodiments are now described more fully with reference to the accompanying drawings. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
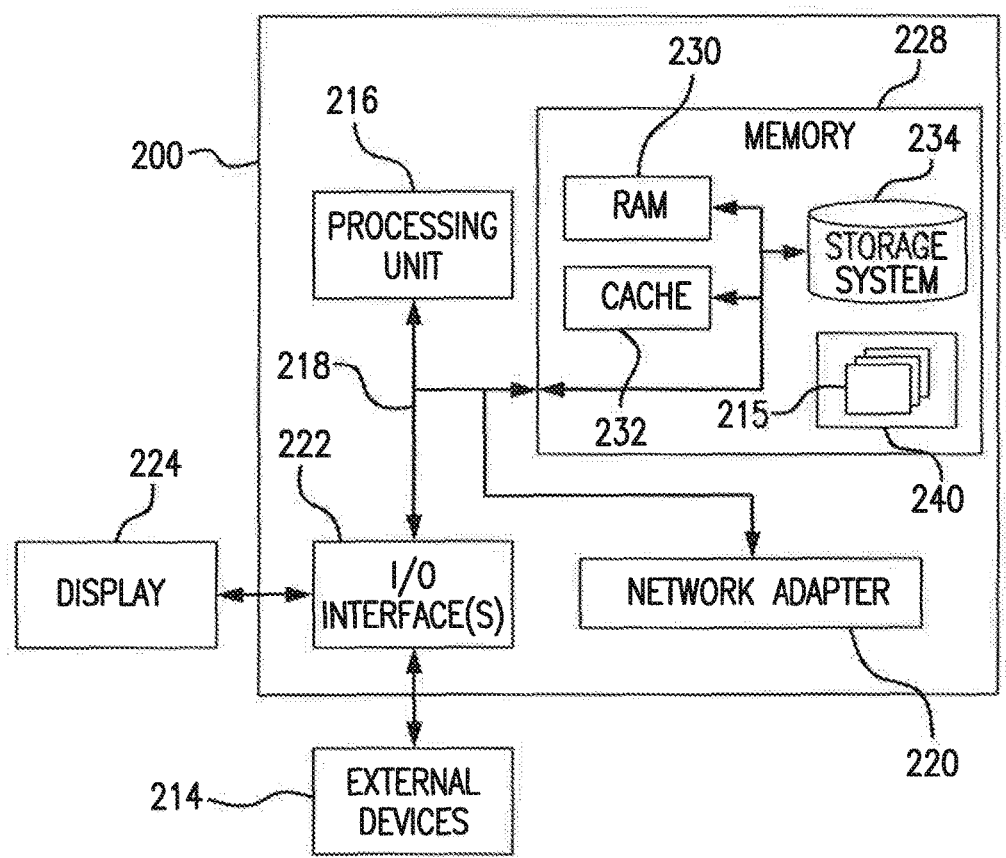
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided.

Figure 3:
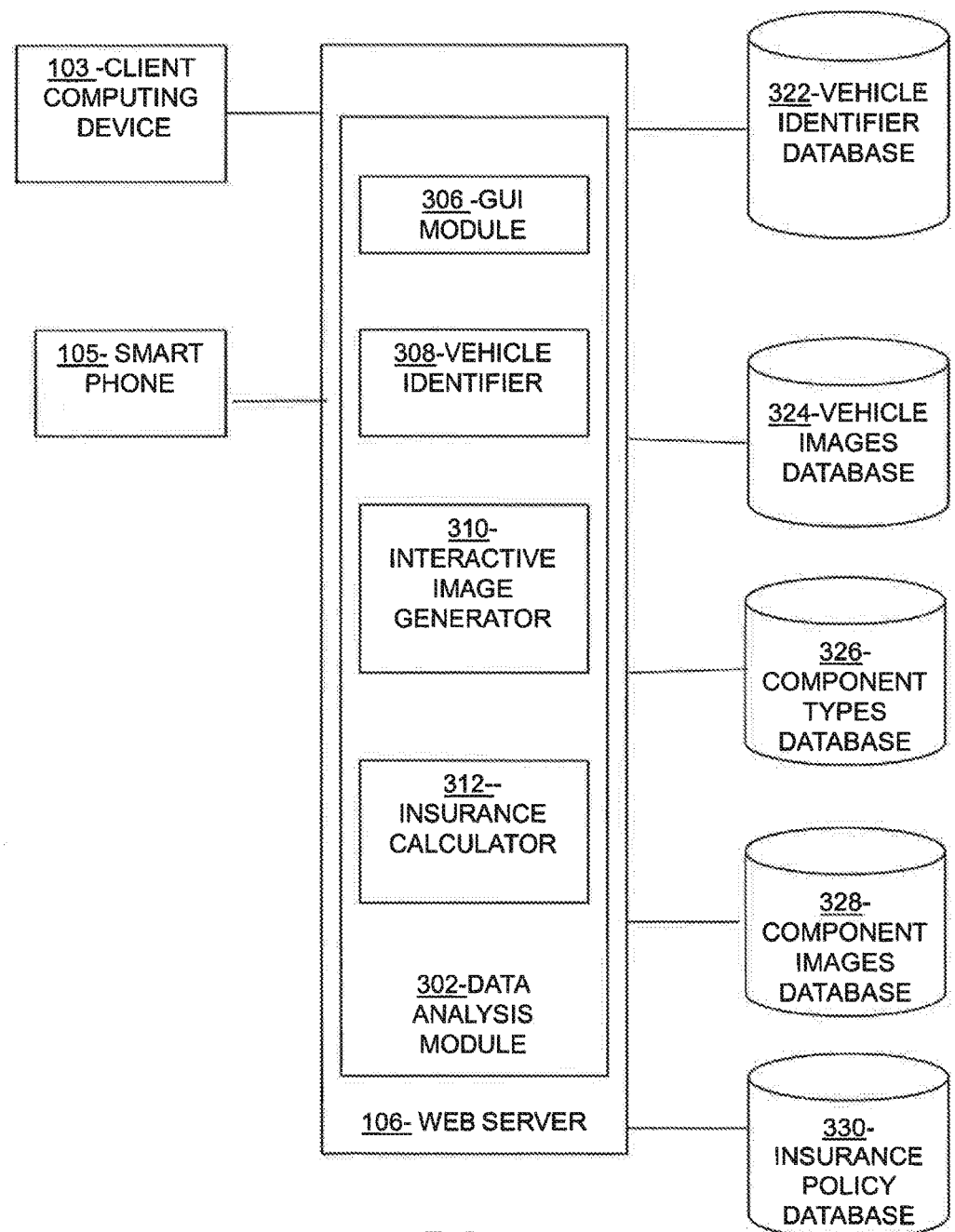
FIG. 3 illustrates a block diagram of an exemplary replacement cost determination system in accordance with an embodiment of the present disclosure.

With reference now to FIG. 3, a block diagram of an exemplary replacement cost determination system 300 is shown. The replacement cost determination system 300 includes an insurance web server 106 that communicates with one or more client devices, such as client computing devices 103 and smart phones 105. The insurance web server 106 includes a data analysis module 302. The data analysis module includes a user interface (UI) module 306 that manages communication between the insurance web server 106 and the client devices 103 and 105, a vehicle identifier 308, an interactive image generator 310, and an insurance calculator 312.

The insurance web server 106 can access information in one or more databases. Examples of databases include a vehicle identifier database 322, a vehicle images database 324, a component types database 326, a component images database 328, and an insurance policy database 330. In embodiments, the vehicle identifier database 322 correlates vehicle identification information to configuration information about the vehicles. The configuration information can include, for example, the make, model, and year of the vehicle as well as other general configuration information about the vehicle, such as number of cylinders, number of doors, color, number of passengers it can accommodate, type of transmission, number of wheels, motorcycle category (e.g., all terrain vehicle (ATV), street, moped, street standard, street cruiser, scooter, etc.), boat type (e.g., motor yacht, house boat, etc.), boat length, and plane type (e.g., single engine prop, turbo prop, etc.).

In certain illustrated embodiments, the vehicle identifier database 322 correlates configuration information with a vehicle that most closely resembles the configuration information.

The replacement cost determination system 300 can provide replacement cost information for a variety of different types of vehicles and associated components. For illustrative purposes only, and without limitation, the description below is directed to motorcycles. Accordingly, the description below can be applied to other types of vehicles, with or without motors, such as automobiles, motorcycles, bicycles, boats, planes, and recreational vehicles, without limitation thereto.

The vehicle images database 324 correlates vehicle configuration information to shell images of vehicles. Each shell image provides an initial image of a vehicle. The shell image can include an outline for the vehicle that shows the vehicle's general shape and features. The shell image can include an initial set of components that are associated with parts of the motorcycle, e.g., wheels, exhaust, audio, suspension, etc. The initial set of components can be generic, or alternatively can be specified to have particular characteristics. For example, the initial set of components can be standard components, such as components without upgrades that are provided on a standard motorcycle by the factory. In certain illustrated embodiments, the shell image does not include components, or includes a partial set of components.

In certain illustrated embodiments, a component can be a non-interactive displayed feature of the image that does not respond to user actions. In certain illustrated embodiments, the component can be semi-interactive such that information is output to a user (e.g., by display or audio) upon selection of the component. For example, when a user hovers a position control indicator, such as a cursor over the component, information about the component can be displayed to the user. For example, the user can operate a user input device, such as a keyboard or mouse, to move a cursor so that it hovers over the component for a minimal time period, upon which a bubble having information about the component can be displayed next to the component.

The component types database 326 can include a collection of component types for different components of a motorcycle. The components can have associated information, such as market price range, compatibility with motorcycles (e.g., based on configuration information of the motorcycles), types of motorcycles, and/or other components. For example, the component types database 326 can include a collection of different types of wheels, each wheel type having an associated part number, name, make, model, market price range, and/or designation of motorcycle types that the wheel type is compatible with. The component images database 328 can include images for the different component types stored in the component types database 326. The images can be associated with a part number, name, make, and/or model of the component type that uniquely identifies the component type. Those skilled in the art will readily understand that the component types database 326 and the component image database 328 can be combined.

The insurance policy database 330 stores vehicle insurance policy information for a plurality of individuals. The insurance policy information can include replacement value information for an insured vehicle, replacement value information for a component of an insured vehicle, and premium information associated with policy that a customer pays to keep the policy in good standing.

Figure 4:
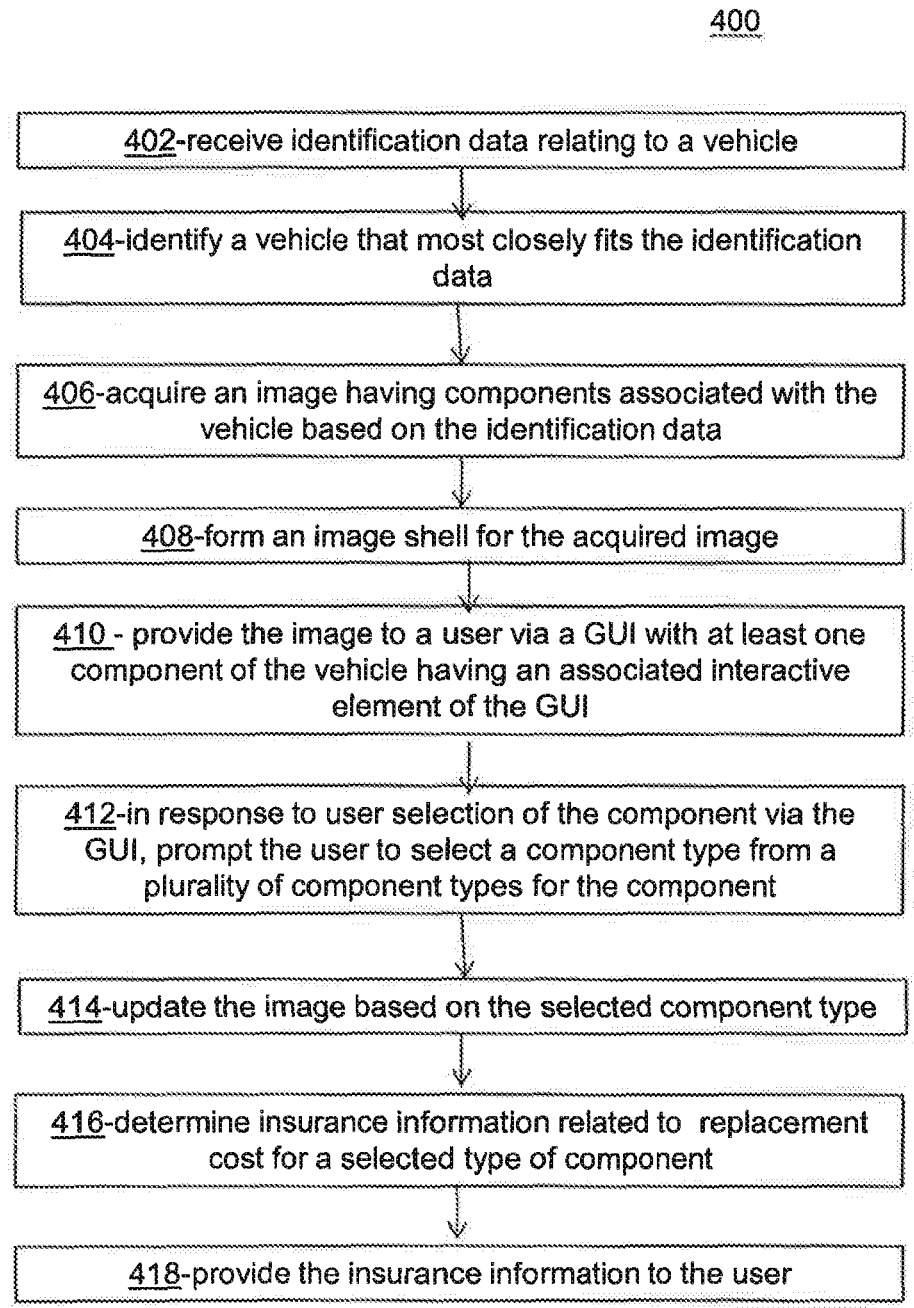
FIG. 4 illustrates a flowchart for preforming an example method in accordance with an embodiment of the present disclosure.

With reference now to FIG. 4, shown is a flowchart 400 demonstrating implementation of the various exemplary embodiments. Flowchart 400 includes operations that can be performed by the web server 106. It is noted that the order of operations shown in FIG. 4 is not required, so in principle, the various operations may be performed out of the illustrated order. Also certain operations may be skipped, different operations may be added or substituted, or selected operations or groups of operations may be performed in a separate application following the embodiments described herein.

At operation 402, identification data relating to a vehicle is received, e.g., from a client computing device 103 or a client smart phone 105. The identification data can include information that identifies a particular vehicle, such as a vehicle identification number (VIN). The identification data can identify a particular vehicle by including a registration or license plate number and can further include additional configuration data, such as make, model and/or year.

In embodiments, the identification data can include configuration data that describes a customized vehicle. The vehicle can actually exist or be fictitious. The identification information may not include information that identifies a particular vehicle, but that rather describes the vehicle in accordance with the way that it is customized. The GUI module 306 may provide a GUI via which a user can enter the configuration data for the customized vehicle. The GUI can be interactive and provide selections for a user to select from, such as by providing a dropdown menu of selections or navigation choices. The user can use a variety of tools provided by the GUI's tools to make or modify selections in order to enter configuration data that meets the user's criteria.

At operation 404, a vehicle is identified in the vehicle identifier database. The vehicle identified can be the particular vehicle that was identified by the identification data. Once the particular vehicle is identified, configuration for the data is determined, such as make, model, year, type of vehicle, weight, and/or number of passengers that can be accommodated by the vehicle. In embodiments in which configuration data was entered by the user to identify a customized vehicle, step 404 can be omitted, or at step 404 the vehicle identified can be the closest fit determined to satisfy the criteria associated with user entered configuration data.

At operation 406, an image is acquired for the identified vehicle or customized vehicle based on the configuration data that was entered by the user or was associated with the vehicle identified at operation 404. The image can be acquired automatically using database searching techniques, or manually with human analysis, from the vehicle images database 324. In embodiments the image can be acquired from the World Wide Web. Selection of the image from the World Wide Web can be performed automatically, such as by using web crawling techniques to search web sites of the World Wide Web. Manual techniques that use human analysis to search the World Wide Web can also be used.

At operation 408, the image acquired at operation 406 can be processed to form an image shell that includes an outline for the identified vehicle that shows its general shape and features. In embodiments, the acquired image can include indications, such as outlines, of one or more external components. Each vehicle type has components that are included in each vehicle. In the present example for a motorcycle vehicle, the image shell can include an indication, such as an outline, of components typically included in motorcycle vehicles, including external components, such as a handlebar, wheels, footrests, exhaust, seat, lights, and bodywork.

The image shell can be generated using image processing techniques, such as optical recognition and/or edge recognition to detect features and edges of the image acquired at operation 404. A determination is made which recognizes lines and features of the acquired image to retain in the image shell, and which lines and features to remove from the image shell.

At operation 410, the image can be further processed to generate a configurable image that includes configurable initial components. One or more of the initial components can be associated with an interactive element that provides an interactive capability for configuring the component. The user can indicate via the GUI which components are to be provided with interactive capability.

Operation 410 includes using information that is provided by the configuration information about the components of the identified vehicle. The component types database 326 can be consulted to determine initial components for the vehicle, such as based on the configuration information, e.g., model, make, and year of the vehicle. The initial components can be standard component types, as determined from the component types database 326. The component images database 328 can be consulted to acquire images of the initial components and to integrate images of the initial components into the configurable image.

At least one of the initial components is associated with an interactive element of the GUI causing the initial component to be a configurable component. The interactive element can include the ability to detect when the associated component is selected, such as by highlighting, clicking on, right-clicking on, or hovering over the component in accordance with operation of a user input device, such as a mouse, keyboard, or touch screen. The interactive element further facilitates changing the configurable image in response to the user input.

Interactive elements can be associated with external components of the vehicle, such as wheels, exhaust, and seat, and/or with internal components of the vehicle, such as suspension, drive, and transmission. The user can interact with the interactive elements associated with both the external components or the internal components. For example, in embodiments, the configurable image can be viewed in a first mode in which the interactive elements associated with the external components can be accessed by the user, and a second mode in which the interactive elements associated with the internal components can be accessed by the user.

At operation 412, in response to detection at operation 410 of user selection of a component by the associated interactive element, selections are provided, e.g., displayed, to the user to prompt the user to select a component type for the selected component. The component types database 326 is consulted to determine which component types can be used for the selected component. Information related to the component types can also be acquired, such as market price and availability information. The component types available for selection can be displayed, for example, as a pop-up menu. Related information for each component type selection can be displayed with the selection, or as ancillary to the selection, such displayed in a bubble upon right-clicking on or hovering over the selection.

At operation 414, the configurable image is updated based on the selected component type. The component images database 328 can be consulted to acquire an image of the selected component. The interactive element associated with the component being updated indicates the location in the configurable image for integrating the image of the selected component into the configurable image. Image processing techniques can be used to determine the orientation and sizing of the image of the selected component for integration into the configurable image.

Operations 412 and 414 can be performed repeatedly, such that a user can interact with the configurable image to select a component, and select a component type for the selected component from a menu of component type selections. The configurable image can be updated each time that a component type is selected.

At operation 416, insurance information related to replacement cost for the selected component type is determined. The insurance information can include the replacement cost for the component based on the selected component type or the replacement cost for the vehicle. The insurance information can also include the change in replacement cost relative to the present replacement cost or a previously determined replacement cost determined during a previous iteration of operation 416.

The insurance information can also include the insurance premium for insuring the vehicle based on the selected component type. The insurance information can also include the change in insurance premium relative to the present insurance premium or a previously determined insurance premium determined during a previous iteration of operation 416.

At operation 418, the insurance information determined at operation 416 is provided to the user, such as by displaying the insurance information or generating a printable report. Operations 416 and 418 can be performed each time that a component is reconfigured by selecting a different component type at operation 412. In certain illustrated embodiments, operations 416 and 418 can be performed upon request, such as by selecting an actuator provided on the GUI to request updated insurance information in accordance with the current component type selections.

A user can continue to operate the GUI to select different components and component types and obtain updated insurance information. Accordingly, the user can view the insurance information associated with a contemplated purchase to make an informed decision whether to upgrade the vehicle and/or to upgrade the insurance following a vehicle upgrade. The updated insurance information is theoretical, and does not affect the user's actual coverage. The GUI can also provide an option for the user to submit a request to update the user's actual present insurance coverage.

In certain illustrated embodiments, the GUI can provide a capability for the user to renew or update an existing insurance policy. The GUI can present an image of the user's vehicle, including images of the components and designating component types for the components in accordance with the insurance company's information of record at that time. The user can interact with the image by selecting a component to determine the component type of record for that component. The user can update the component type for that component if it is not accurate, view the effect of the update on the insurance information, and/or submit a request to update the insurance coverage in accordance with the component type update.

Figure 5:
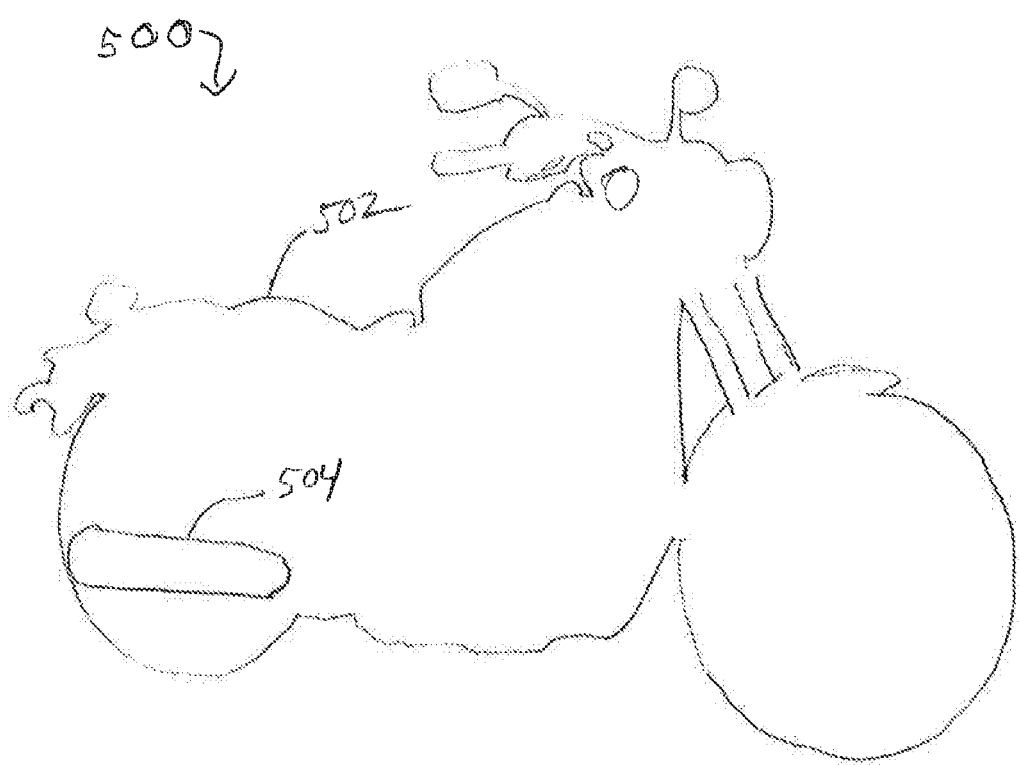
FIG. 5 illustrates an example image shell of a vehicle, in accordance with the present disclosure.

With reference to FIG. 5, an illustration is provided of an example shell image 500 generated from an image of the identified motorcycle acquired at operation 406 of the method shown in flowchart 400. The shell image 500 includes a perimeter outline 502 of the vehicle and an outline 504 of one or more detected external components of the vehicle, such as wheels and an exhaust.

Figure 6:
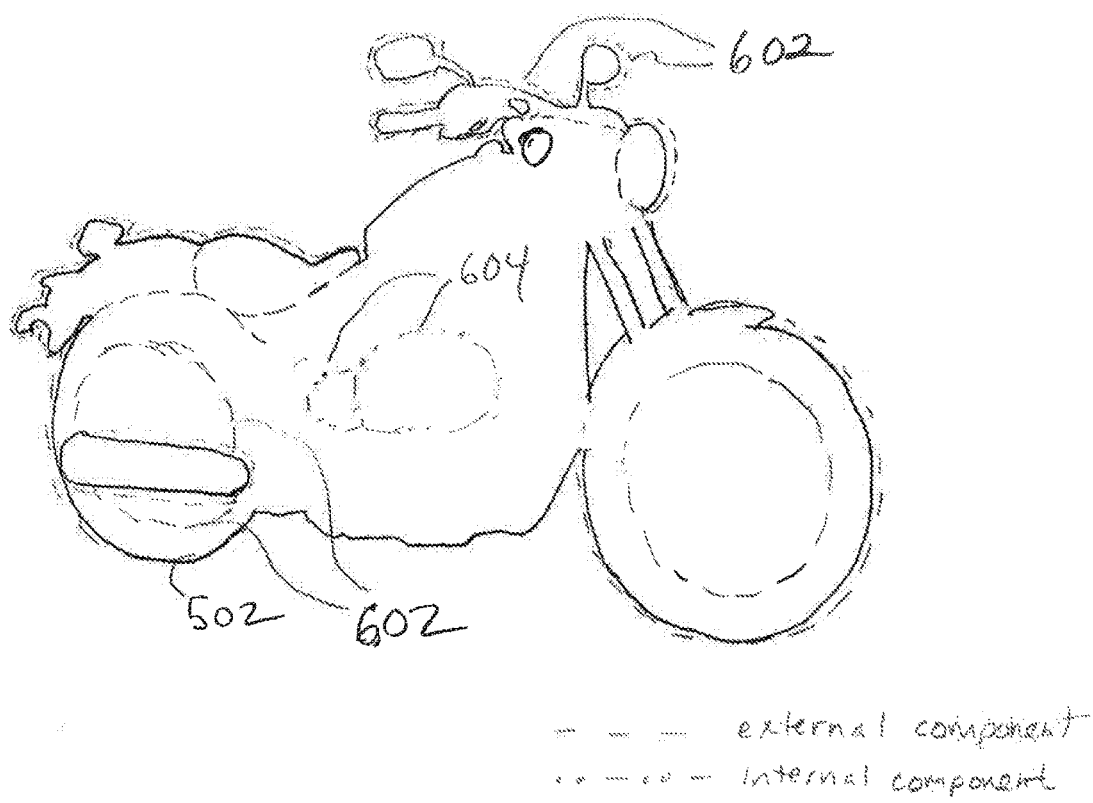
FIG. 6 illustrates an example configurable image of a vehicle, in accordance with the present disclosure.

With reference to FIG. 6, an illustration is provided of an example configurable image 600 generated from shell image 500. The configurable image 600 includes the perimeter outline 502 of the vehicle, indicator lines 602 showing the location on the vehicle of external components that have associated interactive elements, and indicator lines 604 of internal components that have associated interactive elements.

Figure 7:
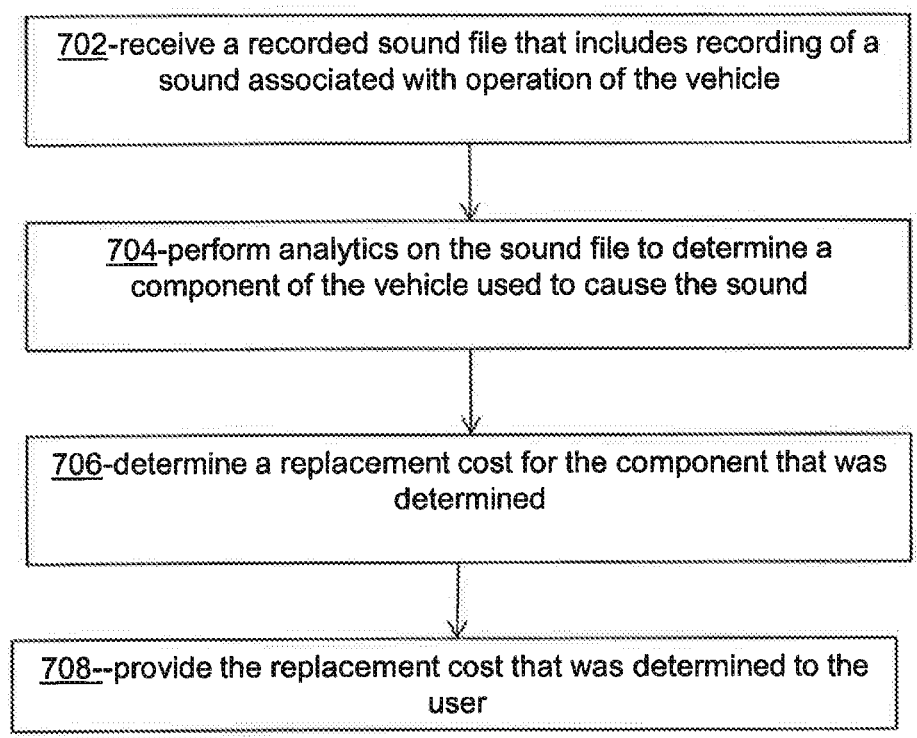
FIG. 7 illustrates a flowchart for preforming an example method in accordance with another embodiment of the present disclosure.

With reference now to FIG. 7, shown is a flowchart 700 demonstrating implementation of the various exemplary embodiments. Flowchart 700 includes operations that can be performed by the web server 106. It is noted that the order of operations shown in FIG. 7 is not required, so in principle, the various operations may be performed out of the illustrated order. Also certain operations may be skipped, different operations may be added or substituted, or selected operations or groups of operations may be performed in a separate application following the embodiments described herein.

At operation 702, a recorded sound file is received that includes recording of a sound associated with operation of the vehicle. At operation 704, analytics are performed on the sound file to determine a component of the vehicle used to cause the sound. At operation 706, a replacement cost is determined for the component that was determined. The replacement cost that was determined is provided to the user.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for determining replacement cost associated with a vehicle, the computer system comprising:
   a memory configured to store instructions;
   a processor disposed in communication with the memory, wherein the processor upon execution of the instructions is configured to:
     receive identification data relating to a vehicle;
     acquire an initial shell image based on the identification data, the initial shell image having components associated with the vehicle;
     provide the initial shell image to a user via a graphical user interface (GUI) with at least one interactive component of the vehicle, each of the at least one interactive component having an associated interactive element of the GUI;
     in response to user selection of the interactive component, provide by the GUI multiple hierarchical prompts for the user to select a custom component type from a plurality of the component types for the component;
     in response to providing the multiple hierarchical prompts via the GUI, prompt the user to select the custom component type from a plurality of component types for the component;
     generate a customized shell image based on the initial shell image and the custom component type;
     provide the customized shell image to a user via the GUI with the at least one interactive component of the vehicle;
     determine a replacement cost for a selected custom component type;
     determine a premium associated with an insurance policy covering the vehicle, wherein the premium is based on a difference between the replacement cost for the selected custom component and an associated standard component from an initial set of components represented in the initial shell; and
     provide the premium to the user via the GUI.

2. The computer system as recited in claim 1, wherein the processor upon execution of the instructions is further configured to determine a replacement cost for the vehicle based on the replacement cost that was determined for the selected custom component type, wherein the premium is further based on the replacement cost.

3. The computer system as recited in claim 1, wherein the vehicle is one of a:
   motorcycle, automobile boat, plane, or other recreational vehicle.

4. The computer system as recited in claim 1, wherein the custom component is one of an exhaust system, wheel, engine component transmission component, seat type, chassis component, sound system component, alarm component, and instrumentation component.

5. The computer system as recited in claim 1, wherein the custom component type is one of a model, make, grade, and style of the selected component.

6. The computer system as recited in claim 1, wherein the user selects a plurality of interactive components.

7. The computer system as recited in claim 1, wherein the processor upon execution of the instructions is further configured to:
   determine orientation and sizing for the custom component type before generating the customized shell image.

8. A computer system for determining replacement cost associated with a customized vehicle, the computer system comprising:
   a memory configured to store instructions;
   a processor disposed in communication with the memory, wherein the processor upon execution of the instructions is configured to:
     access an image of the customized vehicle;
     perform image processing on the image to generate a shell of the customized vehicle, wherein the shell of the customized vehicle is associated with an initial set of components for a model of the customized vehicle;
     perform image processing on the image to detect a customized component of the vehicle, wherein the customized component is not within the initial set of components;
     update the shell based on detection of the customized component;
     determine a replacement cost for the customized component;
     determine a premium associated with an insurance policy covering the vehicle, wherein the premium is based on a difference between the replacement cost for the customized component and an associated standard component from the initial set of components; and
     provide the premium to a user.

9. The computer system as recited in claim 8, wherein the replacement cost is associated with an insurance policy.

10. The computer system as recited in claim 9, wherein the processor upon execution of the instructions is further configured to determine a premium associated with the insurance policy based on the replacement cost.

11. The computer system as recited in claim 8, wherein the processor upon execution of the instructions is further configured to determine a replacement cost for the vehicle based on the determined replacement cost.

12. The computer system as recited in claim 8, wherein the processor upon execution of the instructions is further configured to:
   determine orientation and sizing for the customized component before updating the shell.

13. A method, comprising:
   receiving, at a computer system, identification data relating to a vehicle;
   acquiring an initial shell image based on the identification data, the initial shell image having components associated with the vehicle;
   providing the initial shell image to a user via a graphical user interface (GUI) with at least one interactive component of the vehicle, each of the at least one interactive component having an associated interactive element of the GUI;
   in response to user selection of the interactive component, providing by the GUI multiple hierarchical prompts for the user to select a custom component type from a plurality of the component types for the component;
   in response to providing the multiple hierarchical prompts via the GUI, prompting the user to select the custom component type from a plurality of component types for the component;
   generating a customized shell image based on the initial shell image and the custom component type;
   providing the customized shell image to a user via the GUI with the at least one interactive component of the vehicle;
   determining a replacement cost for a selected custom component type;
   determining a premium associated with an insurance policy covering the vehicle, wherein the premium is based on a difference between the replacement cost for the selected custom component and an associated standard component from an initial set of components; and
   providing the premium to the user via the GUI.

14. The method as recited in claim 13, further comprising:
   determining orientation and sizing for the custom component type before generating the customized shell image.

15. The method of claim 13, further comprising:
   determining a replacement cost for the vehicle based on the replacement cost that was determined for the selected custom component type, wherein the premium is further based on the replacement cost.

16. The method of claim 13, wherein the vehicle is one of a:
   motorcycle, automobile boat, plane, or other recreational vehicle.

17. The method of claim 13, wherein the custom component is one of an exhaust system, wheel, engine component transmission component, seat type, chassis component, sound system component, alarm component, and instrumentation component.

18. The method of claim 13, wherein the custom component type is one of a model, make, grade, and style of the selected component.

19. The method of claim 13, wherein the user selects a plurality of interactive components.

\* \* \* \* \*